United States Patent
Laatu

(12) 
(10) Patent No.: US 6,212,380 B1
(45) Date of Patent: Apr. 3, 2001

(54) METHOD AND ARRANGEMENT FOR A HANDOVER BETWEEN BASE STATION CONTROLLERS

(75) Inventor: Juho Laatu, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/894,411

(22) PCT Filed: Feb. 14, 1996

(86) PCT No.: PCT/FI96/00084

§ 371 Date: Aug. 20, 1997

§ 102(e) Date: Aug. 20, 1997

(87) PCT Pub. No.: WO96/26620

PCT Pub. Date: Aug. 29, 1996

(30) Foreign Application Priority Data

Feb. 20, 1995 (FI) .......................................... 950777
Feb. 20, 1995 (FI) .......................................... 950778

(51) Int. Cl.$^7$ .................................................. H04Q 7/20
(52) U.S. Cl. ........................................... 455/436; 455/450
(58) Field of Search .................................... 455/450, 510, 455/517, 436

(56) References Cited

U.S. PATENT DOCUMENTS 5,590,172 * 12/1996 Lodwig et al. .
5,862,485 * 1/1999 Linneweb, Jr. et al. ............. 455/450

FOREIGN PATENT DOCUMENTS

95/01071   1/1995   (WO) .
95/01694   1/1995   (WO) .
95/04438   2/1995   (WO) .

OTHER PUBLICATIONS

"Switching and Signaling Generic Requirements for Network Access Services to PCS Providers Introduction", GR–2801–CORE, Issue 1, Dec. 1993.

* cited by examiner

Primary Examiner—William Cumming
(74) Attorney, Agent, or Firm—Pillsbury Madison & Sutro LLP

(57) ABSTRACT

An arrangement and method for carrying out a handover between first and second base station controllers in a telecommunications system that includes a local exchange of a fixed network; mobile stations; base station systems providing the mobile stations with a wireless access network to the local exchange, each base station system having a base station controller and a plurality of base stations; transmission circuits for connecting the local exchange to the base station controllers; the control of the handover between the base station controllers being located in the base station controllers so that the first base station controller of the call functions as the anchor point at which the original connection established via the local exchange is maintained, and from which a further connection is established to a second base station controller in a handover. The base station controllers are arranged to maintain the local call connection between base station controllers at the end of the call, and keep it in reserve for the following handover between base station controllers, and the first or second base station controller is arranged to make the decision on using the reserved local call connection as a further connection in a new handover between base station controllers and to communicate the decision to the other one of the base station controllers.

14 Claims, 8 Drawing Sheets

METHOD AND ARRANGEMENT FOR A HANDOVER BETWEEN BASE STATION CONTROLLERS

This application is the national phase of international application PCT/FI96/00084 filed Feb. 14, 1996 which designated the U.S.

FIELD OF THE INVENTION

The invention relates to a handover between base station controllers in a personal telecommunications system (PCS).

BACKGROUND OF THE INVENTION

Various cellular radio systems enabling personal wireless data transmission have been in use for long. An example of the mobile communication systems is the European digital mobile communication system GSM (Global System for Mobile Communications). In addition, a new generation of radio systems is being developed, which is expected to further expand the possibilities of personal wireless communication. One of these systems under standardization is the Personal Communication System (PCS) in the United States. In accordance with the present expectations, there will be two types of PCS networks, namely traditional overlay type networks, and fixed ISDN and PSTN networks. There will be a number of alternatives for the radio interface, one of which is the GSM based PCS1900 (a GSM system operating within the frequency range of 1900 MHz).

Modification of an existing mobile communication standard (such as GSM or DCS1800) to a PCS-overlay network is a relatively straightforward process. Instead, more problems will be caused by PCS networks similar to the fixed ISDN and PSTN networks, employing a standard local exchange (LE) of the fixed network instead of a mobile services switching centre, such as an ISDN/PSTN based network is not directly compatible with the GSM network architecture. The mobile services switching centre is the central entity of the network in a GSM based overlay network. In an ISDN/PSTN based network, however, the local exchange LE does not have any functions supporting the mobile communication network. In the future, the local exchange LE may be assumed to include a small set of general functions that support switching of mobile communication networks (non-call related signalling, handover switching support of some kind), but they are not necessarily very useful for meeting the requirements of the PCS1900 system, for instance.

A solution to this problem is disclosed in "Switching and signalling generic requirements for network access services to personal communication services (PCS) provider", GR-2801-CORE, Issue 1, December 1993, Bellcore, Bell Communications Research, particularly chapter 1, pp. 1 to 10, chapter 2, pp. 1 to 26, and chapter 3, pp. 133 to 137. In a Bellcore network disclosed in the above document, the radio interface is a wireless access communication system WACS (Bellcore TR INS-001313), which is connected to the local exchange of a fixed network. An intelligent network is connected to the local exchange, providing the local exchange with the service logic, the databases and the operations required for the mobility management of the access network. In other words, an AIN network (Advanced Intelligent Network) provides the subscriber database services, location management, authentication, access control etc. in an integrated manner. The basic features of call control are located in an ISDN local exchange, from which call control can initiate intelligent network operations in accordance with predetermined triggers via a standard AIN interface. The Bellcore system also supports handover, which is referred by Bellcore to as "Automatic Link Transfer" (ALT). The aim of ALT is to ensure the continuity of a service to the user when the signal strength varies during an answered call. The signal strength may vary e.g. if a PCS user is moving, or if the conditions of the radio environment change. The aim of ALT is to enable the continuity of an answered ongoing call without interruption, and without the user taking any measures for performing an ALT or being aware of the fact the ALT has taken place. Chapter 3, pp. 133 to 138 of the above-mentioned document discloses an ALT procedure in which a local exchange operates as the "anchor point" of handover. In other words, when an ALT is carried out from an old base station system (IPS/RPCU) to a new base station system (IPS/RPCU), the connection to the old base station system is released in the exchange, and a new connection is established to the new base station system. In such a case, the local exchange for the fixed network is the anchor point of switching and signalling. The handover employing the local exchange as the anchor point may be carried out in new national ISDN exchanges having the required features. This handover concept, however, cannot be considered as an appropriate way of proceeding, particularly at the initial stage of the PCS systems, because most of the existing exchanges of the fixed network represent the older type, and it is not possible to guarantee the availability of exchanges that have the required features. Furthermore, problems are caused by the fact that a network element incompatible with the access network standard, such as the GSM, is used as the anchor point of handover connections.

PCT Publication WO 95/01694 discloses a handover between base station systems under the local exchange of a fixed network whereby the anchor point for handover is maintained in the mobile communication system. In other words, the first base station controller in the call operates as the anchor point to which the initial connection established via the local exchange is maintained for the entire duration of the call. In the handover, a further connection is established from the anchor base station controller to a second base station controller.

SUMMARY OF THE INVENTION

The object of the present invention is to provide an improved, flexible handover between base station controllers, independent of the features of the local exchange of the fixed network.

This is achieved with an arrangement for carrying out a handover between base station controllers in a telecommunications system that comprises a local exchange of a fixed network; mobile stations; base station systems providing the mobile stations with a wireless access network to the local exchange, each base station system comprising a base station controller and a plurality of base stations; transmission lines for connecting the local exchange to the base station controllers; the control of the handover between the base station controllers (BSC) being located in the BSC's so that the first BSC of the call functions as the anchor point at which the original connection established via the local exchange is maintained, and from which a further connection is established to a second BSC in a handover situation. In accordance with the invention, the arrangement is characterized in that the base station controllers are arranged to unrelease the local call connection between base station controllers at the end of the call, and keep it in reserve for the following handover between base station controllers, the first or the second base station controller is arranged to make the decision on using said reserved local call connection as a further connection in a new handover between base station controllers, and to communicate the decision and possible additional parameters related to the connection to the other one of the base station controllers.

The invention further relates to a method for performing a handover between base station controllers in a telecommunications system comprising a local exchange of a fixed network; mobile stations; base station systems providing the mobile stations with a wireless access network to the local exchange, each base station system comprising a base station controller and a plurality of base stations; and transmission circuits for connecting the local exchange to the base station controllers, comprising the steps of:

establishing a connection for a call from the local exchange to a first base station controller serving a mobile station, performing a handover for switching the call and the mobile station from the first base station controller to a second base station controller, controlling the handover by the base station controllers independently of the local exchange, saving the connection from the local exchange to the first base station controller, establishing a further connection from the first base station controller to the second base station controller as a local call switched via the local exchange, switching a call via said further connection to the second base station controller. In accordance with the invention, the method is characterized by unreleasing the local call connection between the base station controllers at the end of the call and keeping it in reserve for the following handover between base station controllers, making a decision in the first or the second base station controller on using said reserved local call connection as a further connection in a new handover between base station controllers, communicating the decision from the base station controller that has made the decision to the other base station controller, establishing a further handover connection via said reserved local call connection from the first base station controller to the second base station controller.

The invention further relates to a second method for performing a handover between base station controllers, said method being characterized by establishing a new connection for a local call in advance and keeping it in reserve for a handover between base station controllers, controlling the handover by the base station controllers independently of the local exchange, saving the connection from the local exchange to the first base station controller, making a decision in the first or the second base station controller on using said reserved local call connection as a further connection in a new handover between base station controllers, communicating the decision from the base station controller that has made the decision to the other base station controller, establishing a further connection for a handover via said reserved local call connection from the first base station controller to the second base station controller.

In the invention, the first base station controller operates the "anchor point" of the handover in a way known per se, the initial speech connection having been switched from the local exchange of the fixed network to the base station via said BSC, and further to a mobile station along the radio path. When a handover is performed to the second BSC, the initial connection between the ISDN local exchange and the first BSC is maintained, and a further connection is established from the first BSC to the second BSC either in form of a local call via a local exchange/local exchanges, or via a permanent connection between the base station controllers. The handover is controlled by the base station controllers. On account of the solution in accordance with the invention, the "anchor point" and the controller of handover is a network element of the radio system, that is, a base station controller, and the local exchange only switches the connection in accordance with the commands of the base station controller. In a handover employing a permanent connection, the local exchange does not participate in the handover in any way. As the handover in accordance with the invention does not require any additional features from the local exchange, it is also possible to perform a handover under the local exchanges of the present type.

Establishing a local call via a local exchange demands signalling between the local exchange and both of the base station controllers. In practice, this signalling load may be reduced so that a connection once established for a local call between two base station controllers is not released immediately after a call or calls that have used the connection are terminated or handed over to another location. Instead, it is possible to maintain the connection for a local call and keep it in reserve for the following handover that requires a connection between the base station controllers. The decision on saving the connection may be taken e.g. on the basis of the traffic load or handover density in the network, that is, when it is assumed that handover connections may soon be needed. It is also possible to establish "handover" connections for local calls in advance for the subsequent handovers when they are expected to take place. The invention reduces the amount of signalling because the connection resources to the local exchange are not reserved and released every time that new handovers take place. A connection once established for a local call can be used for several handover connections. What is needed is signalling between base station controllers only when they establish and release handover connections via this type of "permanent" connection for a local call. Establishing and releasing connections for local calls can thus be carried out in a more stable manner than establishing and releasing the actual handover connections. The invention also allows shortening the switching time of a handover.

Permanent connections between base station controllers may be established within the network at least where handovers frequently take place between these base station controllers. Permanent connections reduce handover-related signalling, and are more advantageous as compared with local calls switched via the local exchange.

Available capacity of another existing local call can also be used for establishing a further connection. This is possible when the speech coding rate/data transfer rate of the radio system is so small (e.g. 13 kbits) that several speech/data signals may be inserted into one 64-kbit or 56-kbit transmission channel.

The base station controllers decide whether a reserved local call, a new local call or a permanent connection is used for establishing a further connection for a handover. Two transmission circuits are required for each further connection, one for each direction of transmission. If a new local call is established for the further connection for a handover, both base station controllers may choose independently of each other the transmission circuits to the local exchange, which connects them. If a further connection for a handover is established by means of a reserved local call in accordance with the invention or via a permanent connection, or available capacity of an existing local call is used, it is important to know which party will make the decision on the type of the connection, and reserve the connection. If both parties were allowed to make reservations independently of each other, the same lines could be reserved simultaneously from both ends. For eliminating this problem, the responsibility for the decision-making may be given to either one of the base station controllers. The decision is then communicated by means of signalling to the other party. A base station controller may shift the decision-making to the other base station controller by omitting the definition of the switching data in signalling.

BRIEF DESCRIPTION OF THE DRAWINGS

In the following, the invention will be disclosed by means of the preferred embodiments with reference to the attached drawings, in which.

PREFERRED EMBODIMENTS OF THE INVENTION

The basic principles of the invention may be applied to connecting any wireless access network to the local exchange of a fixed network and to an intelligent network. In the preferred embodiments of the invention, the access network is a radio system based on the GSM system, such as PCS1900. In other words, the access network is modified from the GSM mobile communications system or its 1800-MHz version DCS1800. As to the details of the GSM system, reference is made to ETSI GSM recommendations and to the book "The GSM System for Mobile Communications", M. Mouly, M. Pautet, Palaiseau, France, 1992, ISBN:2-9507190-0-0-7.

Figure 1:
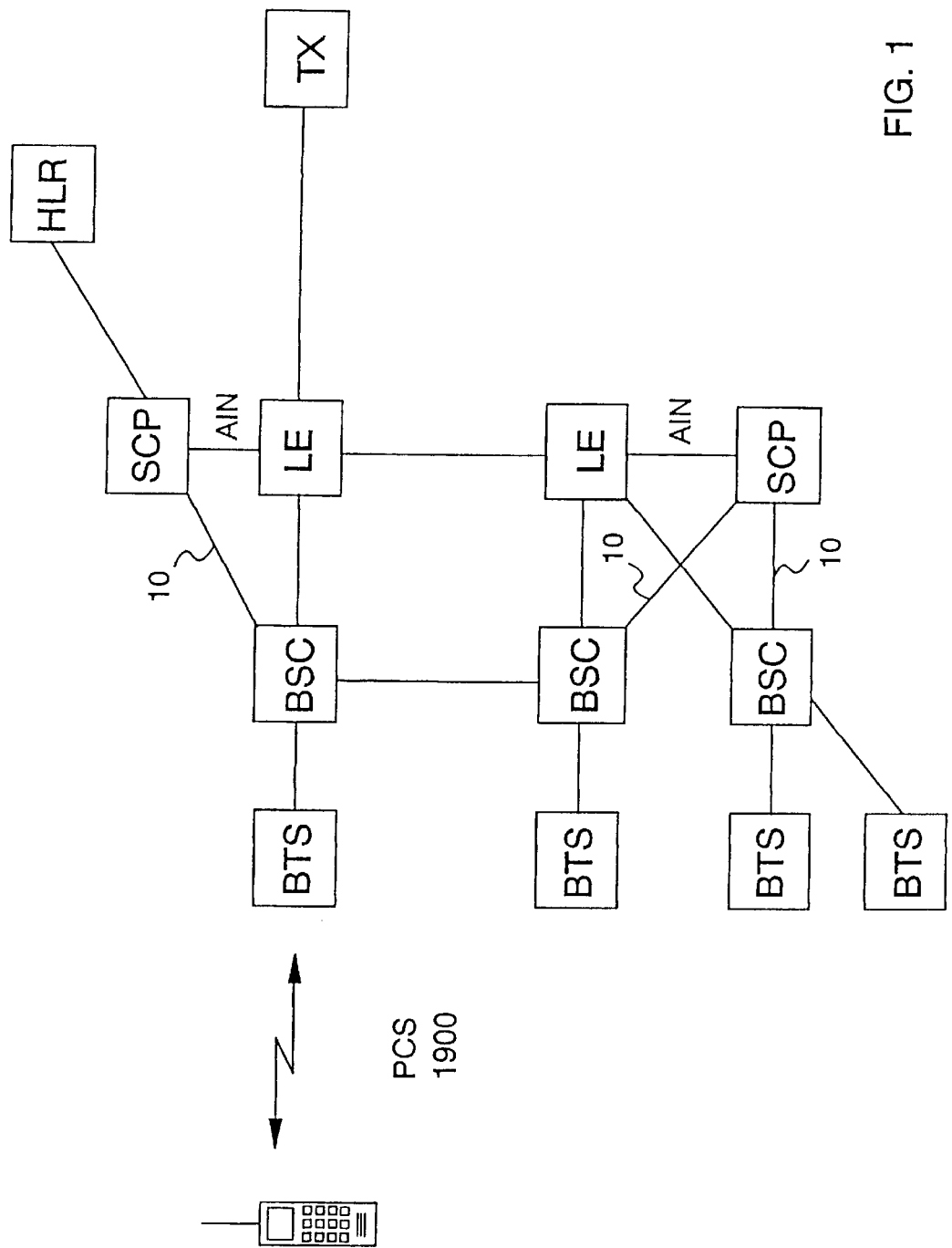
FIG. 1 is a block diagram illustrating an ISDN based PCS network according to the invention.

The block diagram in FIG. 1 illustrates the network elements of a PCS1900 network based on a fixed network. The access network PCS1900 comprises base station systems BSS, each BSS comprising one base station controller BSC and a plurality of base stations BTS. The base stations BTS communicate over the radio interface with personal stations PS (mobile stations). The radio interface between a PS and a BTS, as well as the interface between a BTS and a BSC are similar to those in a conventional overlay PCS1900 system, and they are not paid closer attention to herein. Unlike in a conventional GSM network, however, the base station controllers BSC are not connected to the MSC, but to the local exchange LE of a fixed network, such as ISDN or PSTN. In the preferred embodiments of the invention, the local exchange is constituted by an ISDN exchange. The local exchange LE, in turn, is connected to the service control point SCP of an Advanced Intelligent Network AIN via a standard intelligent network connection. In some cases, the intelligent network is not required. In such a case, the local exchange itself may contain more intelligent functions. Further, the local exchange LE may be connected to the other local exchanges LE or trunk exchanges TX of the ISDN network, as usual.

A PCS network based on a fixed network is thus not directly compatible with the GSM architecture, as there is no mobile services switching centre MSC therein. In a conventional overlay mobile communications network, the mobile services switching centre MSC is the central unit of the network, but the local exchange of a fixed network does not support all of the MSC functionality. Therefore, in the present invention, the functions of the mobile communications switching centre are divided into functional units, which are located in the base station controller BSC, except for the call control. In addition, by means of the intelligent network AIN, a function corresponding to the home location register HLR of the GSM system is provided, as well as part of a function corresponding to the visitor location register.

Figure 2:
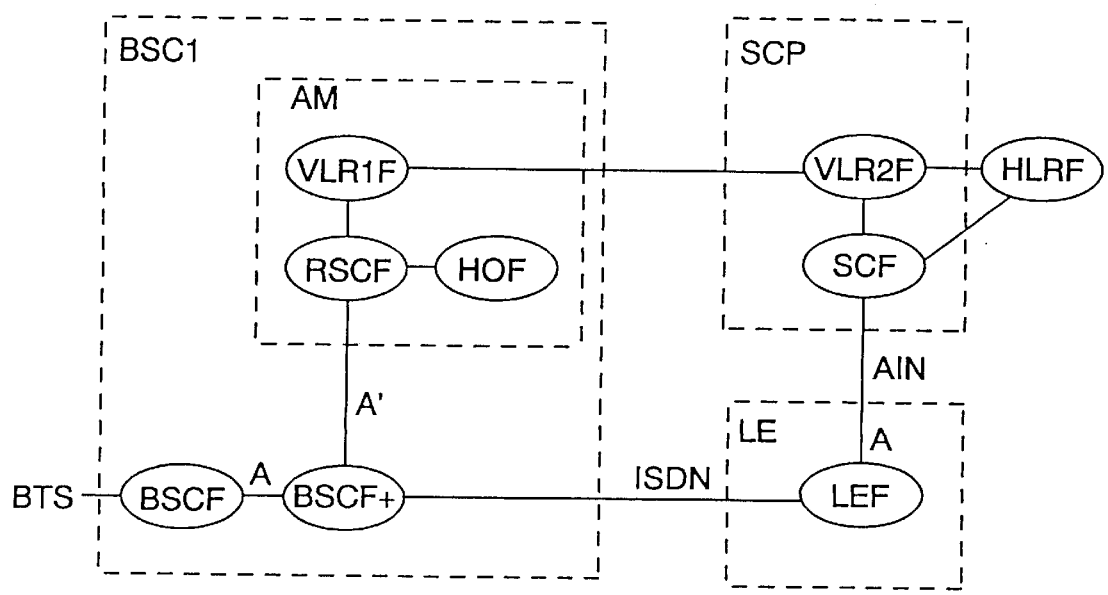
FIG. 2 is a block diagram that illustrates dividing the functions of the mobile services switching centre to functional units and allocating them to different network elements.

Possible allocation of the functional units to the different network elements is illustrated in FIG. 2. Functionally, the names of the units all end with the letter F (function) in order to make a distinction between functional units, and physical network elements (BSC, SCP, LE, . . . ) in which they may be located. In the following, each functional unit will be described briefly.

BSCF (Base Station Controller Function) corresponds to the normal BSC functionality in the GSM network.

BSCF+ (Base Station Controller Function Additions):
 divides the A-interface from the BSCF so that call control is assigned to LEF and other signalling to RSCF,
 carries out the switching operations related to handover (HO) acting as the anchor point for the switching operations,
 converts GSM-based call control into ISDN call control,
 includes different possible interworking functions.

LEF (local exchange function) includes the standard functions of an ISDN local exchange LE (National ISDN3 as a default). LEF may also support non-call related (NCA) signalling from the base station system BSS to the service control point SCP. In the preferred embodiment of the invention, no modifications are suggested to the standard LEF function because an ISDN based PCS1900 system should be able to operate under the ISDN local exchange LE of any standard fixed network.

RSCF (radio system control function) performs several tasks of the mobile services switching centre MSC. It controls radio resources (i.e. it generates e.g. assignment and handover commands, and controls the handover between base station controllers BSC or local exchanges LE). In addition, RSCF is also an interface unit between the A-interface protocols and MAP protocols.

HOF (handover decision function). This unit is separated from the RSCF in order to enable-control of the handover process from an even higher level. However, the high-level decisions only, such as overload control, are made by the HOF. The actual handover is carried out by the BSCF+, and it is controlled by the RSCF.

VLRF (visitor location register function) is a traditional VLR divided into two parts: VLR1F and VLR2F. The upper part VLR2F of the VLR is located in the service control point SCP of the intelligent network, and the lower part VLR1F in the access network, more precisely in the base station controller. In accordance to the division that presently seems most preferable, the lower VLR1F handles authentication, location management, temporary identification, etc., whereas the upper VLR2F handles service control and other matters related to the user's profile.

SCF (service control function) is a standard service control function SCF of the fixed network, providing the standard intelligent network services (AIN). Moreover, it has an ability to carry out location interrogations to the HLRF (corresponding to the gateway-MSC situation), and local location interrogations to the VLRF, as well as to co-operate with the VLRF for responding to AIN interrogations, etc.

The HLRF (home location register function) is a home location register in accordance with the GSM. In addition, the intelligent network comprises an EIRF (equipment identification register function), and possibly an SMS-GIWF (short message service gateway—interworking function), which are not paid closer attention to herein.

In the preferred embodiment of the invention, the functional units described above are distributed among the network elements in accordance with FIG. 2: the LE contains the LEF unit; the SCP contains the SCF and VLR2F units; the BSC contains the BSCF and BSCF+ units, as well as the access manager AM containing the RSCF, HOF and VLR1F units. Alternatively, the entire VLRF may be located in the BSC or in the SCP.

It must be noted that it is only the functional units BSCF, BSCF+, and LEF that handle the actual speech/data connections. These functional units located in the lower part of the functional model are tied to routing connections (chain of connections: BSCF, BSCF+, LEF). The other functional units handle signalling only, and their allocation may therefore differ from what has been disclosed above.

The preferred embodiment of the invention further comprises a new alternative signalling path 10, which bypasses the LE between the BSC and the SCP. This allows a more simple signalling between the BSC and the HLR. The signalling interfaces LE-BSC and SCP-BSC are termed as C-interfaces. The signalling of a C-interface may employ non-call related signalling of an ISDN network, or alternatively, it is possible to utilize a Signalling System NR 7 (SS7) network for the PCS-related signalling between the BSC and the AIN.

In the following, handover procedures in accordance with the invention will be disclosed. In a handover, an ongoing call is handed over from a traffic channel onto another traffic channel in the same or an adjacent base station. The continuity of the call is thus ensured when the signal strength/quality varies when the user moves or the radio environment changes. A handover between base stations located under the same BSC (intra-BSC handover) is substantially performed in the same way as in a conventional PCS1900 system, and it is not essential to the invention. Instead, the present invention, provides improvements to a handover between two base station controllers BSC.

Figure 3A:
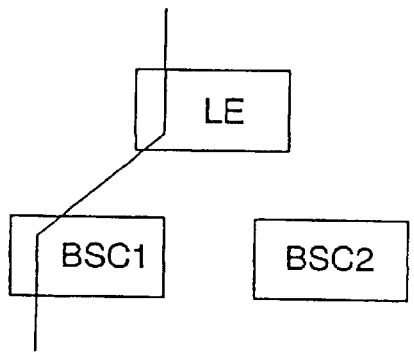
FIGS. 3A, 3B, 3C and 3D show three different ways of performing a handover between base station controllers.
Figure 3B:
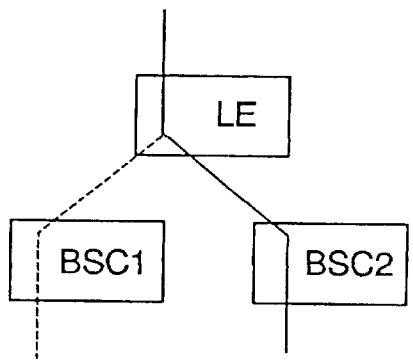

FIGS. 3A, 3B, 3C, and 3D show three different ways of performing a handover between BSC's. FIG. 3A shows a situation prior to a handover, in which a connection is switched via a LE to a BSC1, and further to a mobile station MS via the radio path. The aim is to perform the handover so that the call will be switched via a BSC2 to the mobile station MS. FIG. 3B shows a handover in accordance with the prior art, using the LE as the anchor point for the handover, which requires new features from the LE. This handover technique may be possible in new ISDN exchanges, but it is not a good way of implementation in an early stage of development of the PCS systems as the availability of the exchanges provided with the required features cannot be guaranteed. Further problems are caused by the fact that a network element incompatible with the access network standard (e.g. GSM) is used as the anchor point for handover.

Figure 3C:
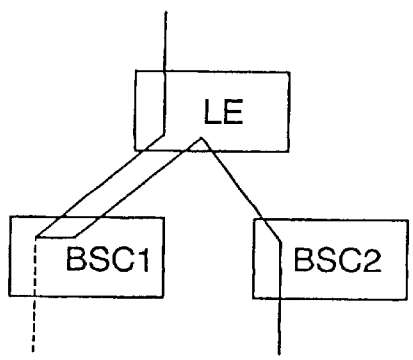

FIG. 3C shows handover based on a local call, in which the initial connection LE-BSC1 is saved, and a further connection is established between the base stations BSC1 and BSC2 via the LE by means of a local call BSC1-LE-BSC2. On account of this solution, BSC1 operates as the anchor point for the handover, and the LE only switches the connection. As no additional features are required from the LE, the handover may be performed under all present ISDN exchanges.

Figure 3D:
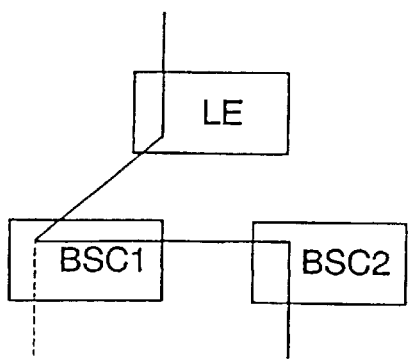

FIG. 3D shows a handover based on a permanent connection. In this case, the initial connection LE-BSC1 is also saved, and a "local call" is established between BSC1 and BSC2, whereby BSC2 operates as the anchor point. In this case, however, when the call is established, it is not switched by the LE, but the permanent connections between BSC1 and BSC2 are used. It must be noted that these permanent connections may physically be routed via the LE. It is advantageous to use permanent connections between the BSC's in accordance with FIG. 3D where handovers take place frequently between said BSC's.

Local call-based subsequent handover

Figure 4:
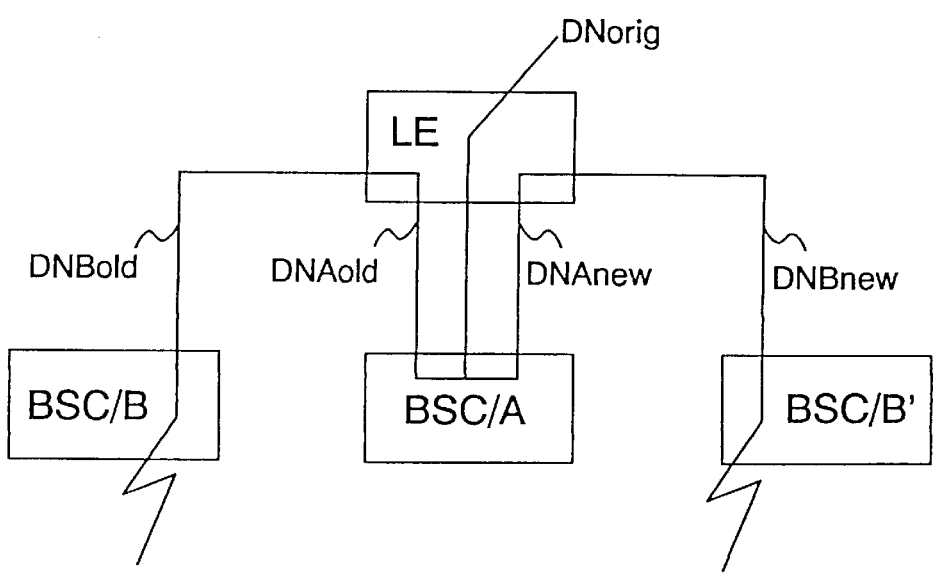
FIG. 4 is a block diagram showing the handover legs in association with two successive handovers.

FIG. 4 shows a call situation in which the original call has been established from a LE to a BSC/A. This connection is identified by the number DNorig. Thereafter, a handover has been performed to a BSC/B. As a result, a local call-based handover leg has been established. This handover leg reserves one circuit DNAold on the side of the anchor BSC/A and one circuit DNBold on the side of the base station controller BSC/B. In the following, a new subsequent handover from BSC/A to BSC/B' will be described. In this handover, a new local call-based handover leg will be established, which reserves a circuit DNAnew on the side of the anchor BSC/A, and a circuit DNBnew on the side of the base station controller BSC/B'. After a successful handover, the old handover leg is released. This is the most complicated case of handover, which is described with reference to the signalling diagram shown in FIGS. 5A, 5B, and 5C, wherein the used numbering corresponds to the numbering used hereinafter.

The names of new messages that are not standard GSM, ISDN, or AIN messages are written with small letters. Capital letters are used in messages in which changes have been made in parameters only. LEF/A, LEF/B, and LEF/B' are the LEF units of the base station controllers BSC/A, BSC/B and BSC/B' in the LE respectively.

1: HANDOVER_REQUIRED message initiates a handover as in the GSM. BSCF+ only forwards this message to RSCF.

2: map_select_target is a new message that has been introduced to enable handover decisions to be made on a higher level in the network. This may be useful if RSCF is allocated to the BSC, and the BSC is not considered to have sufficiently global information on the traffic load of the network etc. The message is sent to HOF. The only purpose of this message is to select the most appropriate target cell (TCI) for the handover and return the target number (Tnr) that indicates the RSCF related to the target cell.

3: MAP_PREPARE_SUBSEQUENT_HANDOVER is a message in accordance with the GSM. The target number parameter (Tnr), however, points to the new visited RCSF, not to the MSC.

4: The decision on what type of a connection should be used for a new handover leg to side B' is made in RSCF. In this example, it is assumed that the RSCF on the anchor side will make this decision. Alternatively, the decision may also be made by B'. The possible alternatives for establishing a connection are to establish a local call BSC/A-BSC/B' via the LE, to use a permanent connection between BSC/A-BSC/B', provided that there is one, or to use a previously reserved, unreleased connection for a local call BSC/A-BSC/B', or part of a previously reserved connection for a local call. RSCF also controls the use of access circuits, that is, directory numbers DN. RSCF allocates a new access circuit DNAnew for a new local call that contains a new leg A–B'.

MAP_PREPARE_HANDOVER is as in the GSM, with the exception that a new parameter HOCT (handover connection type) has been added thereto for enabling application of different types of handover. In addition, the message may include other parameters related to the HOCT parameter. The values of the HOCT parameters, and the possible additional parameters are defined in closer detail in Table I. In a case in which part of an existing local call is used, for instance, the message could include two additional parameters: DNBnew for indicating that the access circuit corresponds to an existing local call on side B', and a CIC (circuit identity code) for indicating which part of the 64-bit/s circuit is used.

5: RSCF on side B' allocates an access circuit DNBnew for a new local call. It must be noted that in a conventional GSM system the VLR allocates the handover number for the new leg. The directory number DNBnew allocated by RSCF, instead, is closely-related to the access circuit used. Therefore, it cannot be returned once the handover is completed, which is the case in the conventional GSM, but only after the handover leg has been released due to releasing a call or due to a new handover. It must also be noted that two access circuits and the corresponding directory numbers are required for a new handover leg.

6: HANDOVER_REQUEST message is as in GSM, but an allocated handover number is sent between RSCF/B' and BSCF+/B' instead of CIC. HOCT and possible additional parameters are included in this message, as well.

7: HANDOVER_REQUEST message is as in GSM. HANDOVER_REQUEST_ack is as in GSM. BSCF+/B' only forwards the message to the RSCF on side A. A Layer 3 information parameter (L3 info) contains the HANDOVER_COMMAND (see 21).

8: MAP_PREPARE_HANDOVER_ack is as in GSM. The HOCT parameter is also included (see 11), as defined in Table I. The HOCT parameter (and the possible additional parameters) are returned to the anchor side to enable negotiation of the connection type and/or control of the telecommunication resources from side B'. In this example, HOCT does not convey any new information to the anchor side A.

9: new_leg_command is a new message linking the RSCF handover control with the BSCF+ call control. RSCF commands BSCF+ to establish a new handover leg for the present call. The new leg will use the number DNAnew and the corresponding access circuit in the BSCF+ on side A, and the number DNBnew (and the corresponding access circuit) in the BSCF+ of side B'. HOCT indicates that the type of this handover is "new local call".

10: SETUP message is as in an ISDN network. The local exchange must establish a local call for the handover leg.

11, 12, 13: INITIAL_ADDRESS_MESSAGE, CALL_PROCEEDING and SETUP are as in ISDN.

14: setup_detect is a new message that indicates to RSCF/B' that a new handover leg is ready. BSCF+/B' is able to link this leg with the previously reserved radio resources on the basis of the used access circuit that corresponds to the number DNBnew.

15, 16, 17: ALERTING, ADDRESS_COMPLETE_MESSAGE and ALERTING are similar to those in ISDN.

18: new_leg_complete indicates that a new handover leg has been established successfully.

19: MAP_PREPARE_SUBSEQUENT_HANDOVER_ack is as in GSM.

20, 21: HANDOVER_COMMAND is as in GSM. BSCF+/B' only forwards the message, but it must be noted that the CONNECT message can now be sent (see 25).

25, 26, 27, 28, 29: CONNECT, CONNECT_ACK, ANSWER_MESSAGE, CONNECT and CONNECT_ACK are as in ISDN.

30: connect_detect is a new message indicating that the access circuit has been connected.

31: MAP_SEND_END_SIGNAL is as in GSM.

32: switch_leg_command is a new message indicating BSCF+/A that the new leg can be used from this moment on. As a result, the old handover leg may be left out. In this example, the HOCT parameter indicates that the local call related to the old leg may be released (cf. Table I). It must be noted, however, that it is not necessary to release the local call after all the handover legs contained in it have been released. It is also possible to keep the connection waiting for new handover leges between side A and side B'. In such a case, the value of the HOCT parameter is "nothing" (cf. Table I).

33, 34, 35, 36: MAP_SEND_END_SIGNAL_ACK message, CLEAR_COMMAND messages, and CLEAR_COMPLETE messages are as in GSM. BSCF+ only forwards the CLEAR_COMMAND message and disconnects the handover leg.

37, 38, 39: DISCONNECT, RELEASE and RELEASE_COMPLETE are as in ISDN.

40: disconnect_detect is a new message indicating that the access circuit and the directory number have been released.

41, 42, 43, 44, 45: RELEASE, RELEASE_ACK, DISCONNECT, RELEASE and RELEASE_COMPLETE are as in ISDN.

46: disconnect_detect is a new message indicating that the access circuit and the directory number have been released.

Handover based on a reserved connection

In this exemplary case, a handover is performed from base station controller BSC/A to base station controller BSC/B using a local call BSC/A–BSC/B for establishing a handover leg, which local call has been reserved previously or left unreleased during a previous call or handover. In other words, the idea is that a local call that has once been reserved does not have to be released immediately after a call (or calls) using it has been released, or a handover has been made to a new location during the call. The local call can be saved, instead, and kept in reserve for the following handover that requires a connection between the same base station controllers. In the handover process shown in FIGS. 5A–5C, for instance, the local call between BSC/A and BSC/B could have been left unreleased by setting the value of the HOCT parameter of the switch_leg_command message sent in 32 to "nothing". Another alternative is to reserve connections for local calls of this kind between base station controllers e.g. for reasons related to call management when it is assumed that handover connections may soon be needed. This method according to the invention reduces the signalling between the base station controllers and the local exchanges as the connection resources are not reserved and released every time that new handover connections are needed or when they are no longer needed. By means of the method of the invention, establishing and releasing local calls may thus be carried out in a more stable manner than establishing and releasing the actual handover connection.

Figure 5A:
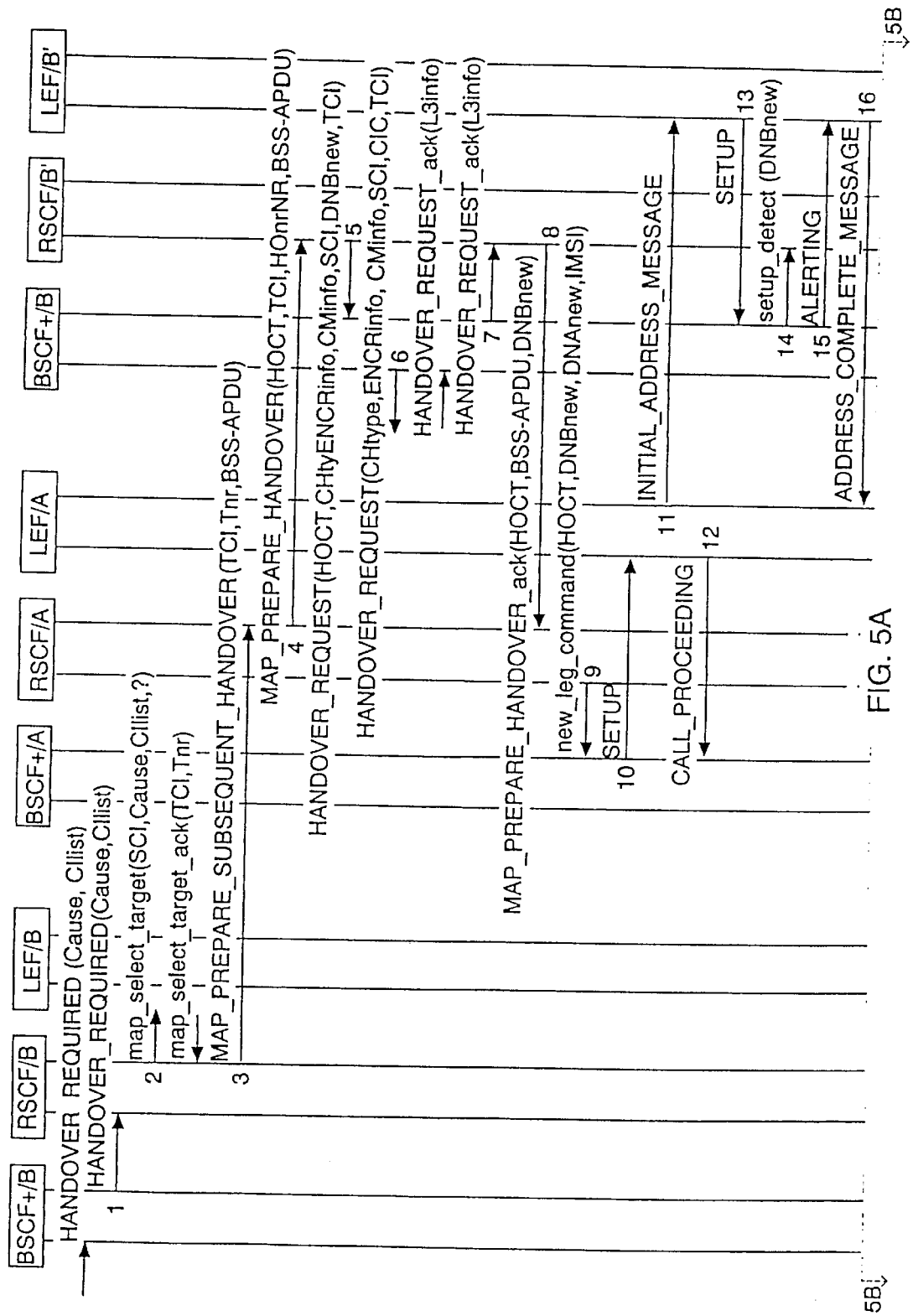
FIGS. 5A, 5B, and 5C show a signalling diagram wherein a new handover A–B' is established, and an old handover leg A–B shown in FIG. 4 is released.
Figure 5B:
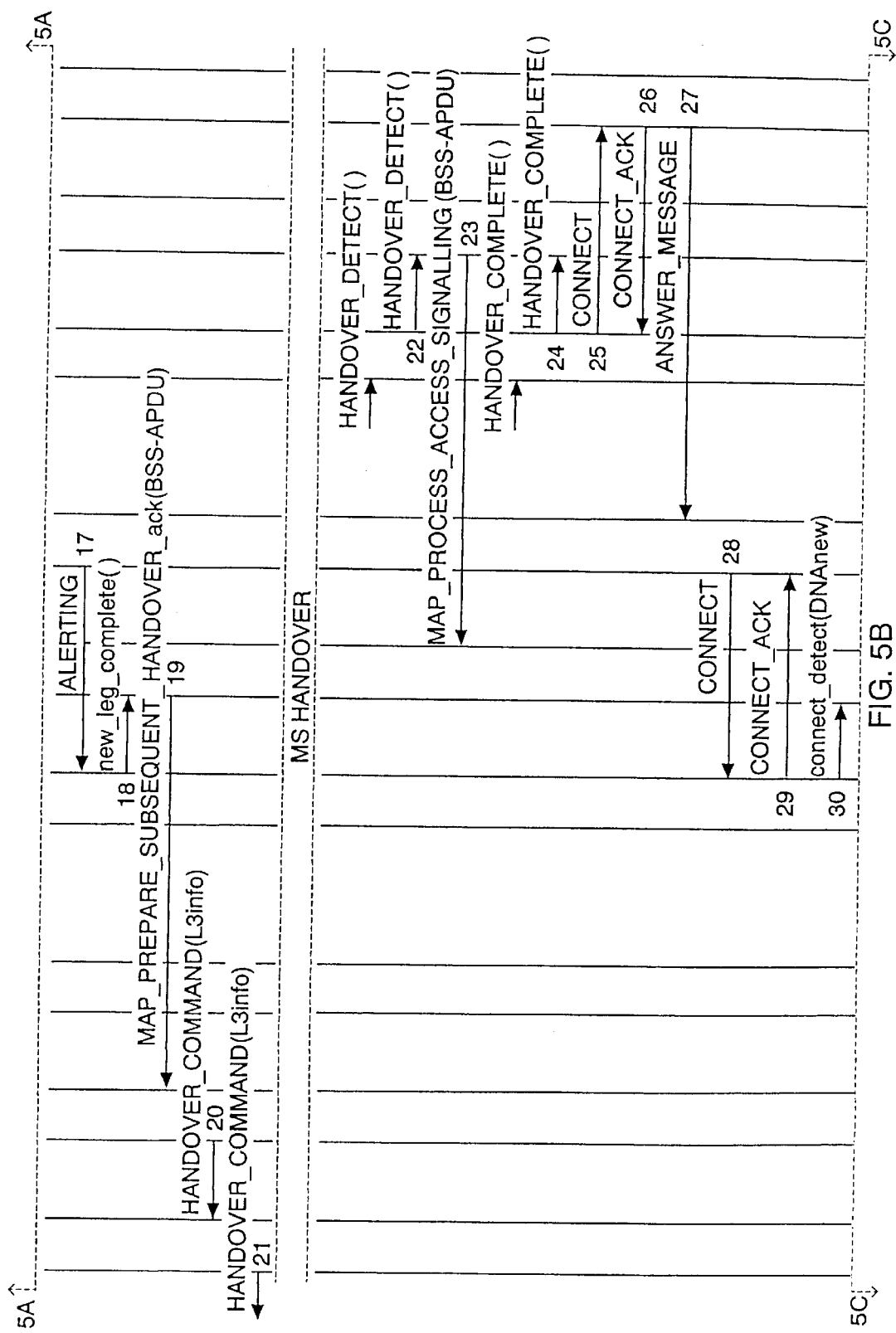
Figure 5C:
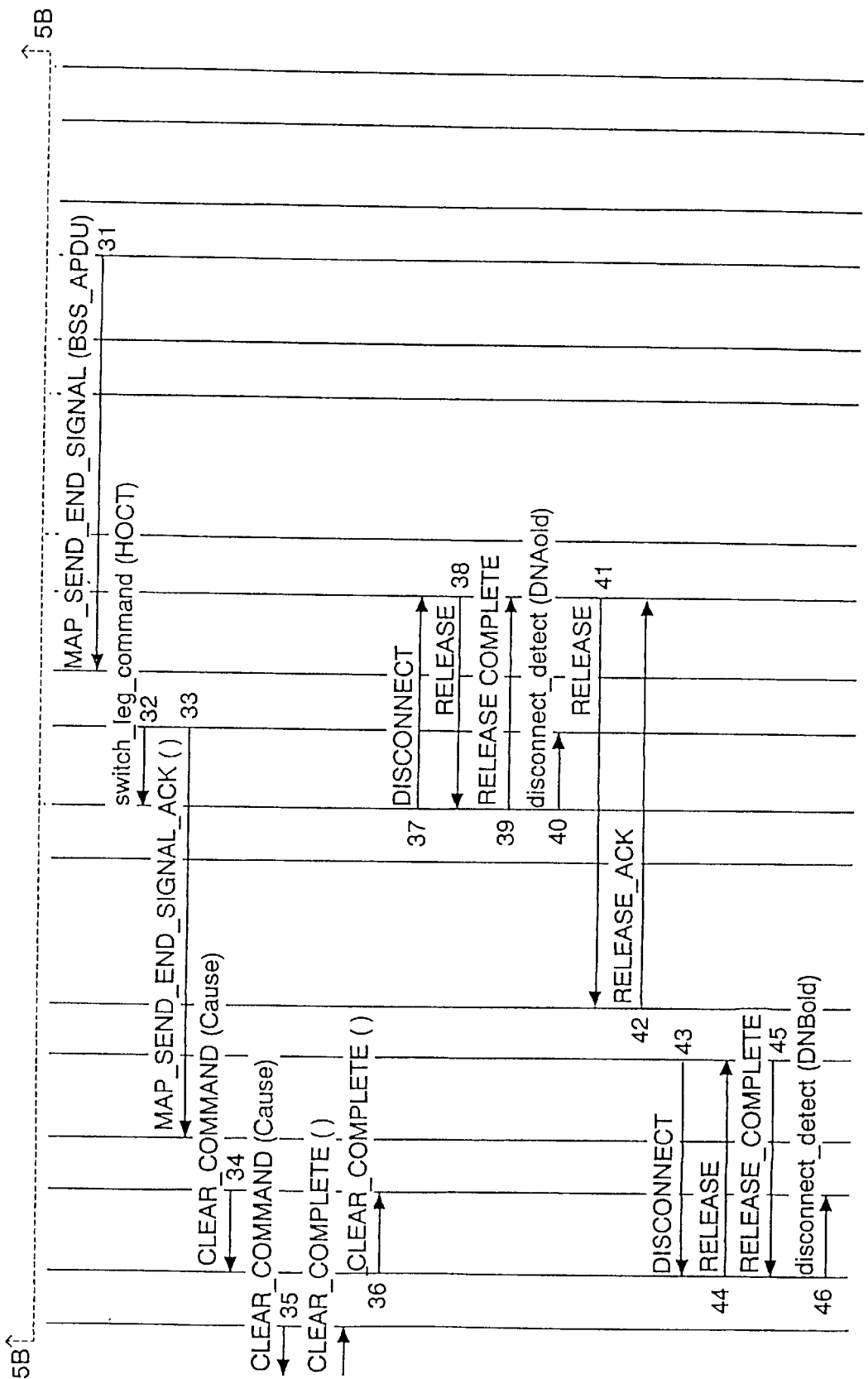
Figure 6:
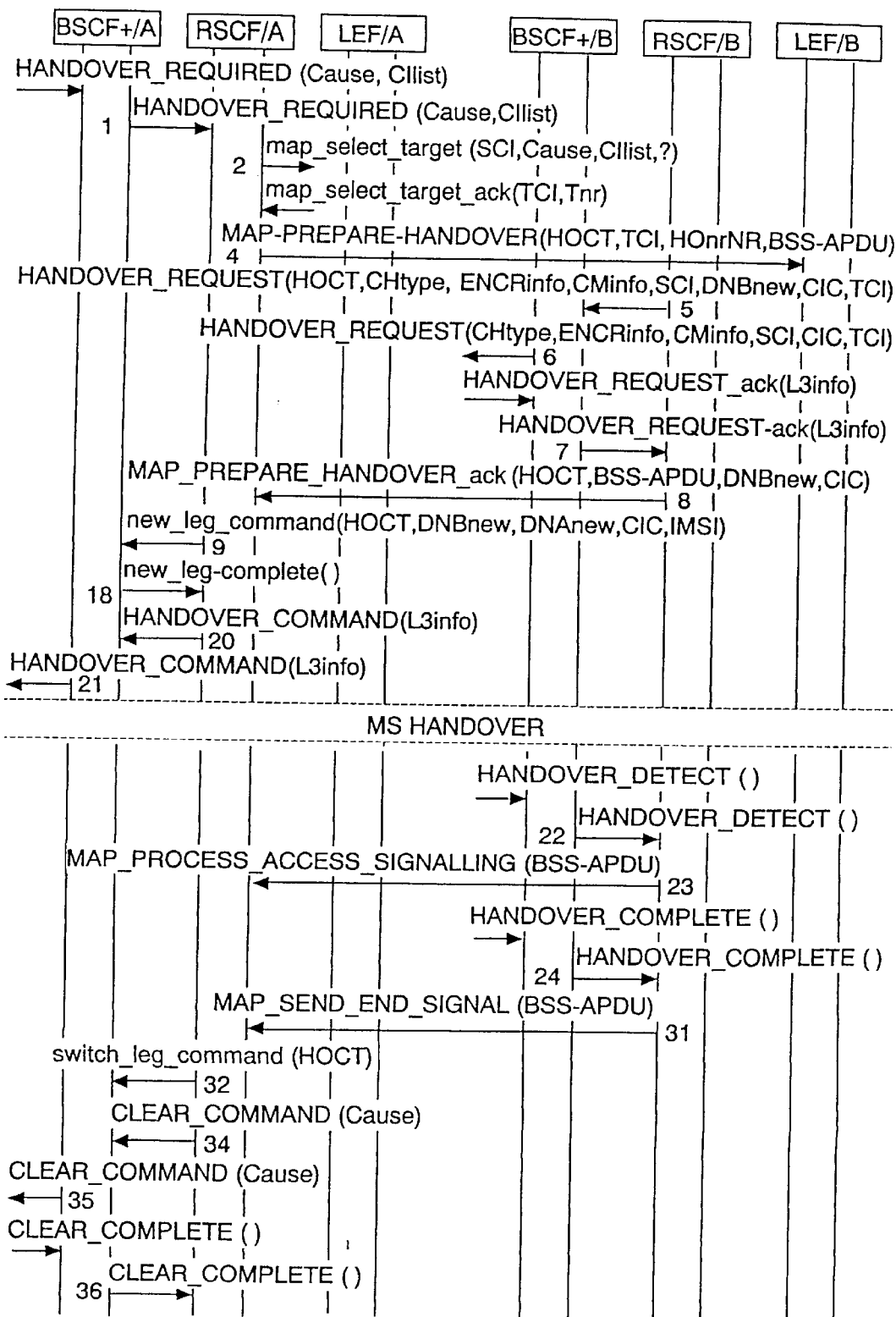
FIG. 6 shows a signalling diagram for a handover based on a previously reserved connection.

The signalling diagram shown in FIG. 6 shows this kind of a handover from BSC/A to BSC/B based on a reserved call. In FIG. 6, the messages whose structure corresponds to the structure of the messages shown in FIGS. 5A, 5B, and 5C are marked with the same numbers. In the following explanation, only the differences compared with the corresponding messages in FIGS. 5A–5C will be listed. In the example it is assumed that the decision on the handover type is made by side B. The RSCF of side A sets the value of the HOCT parameter of the MAP_PREPARE_HANDOVER message to "undefined", which indicates to side B that it will have to make the decision on the handover type (cf. Table I).

1, 2: are as shown in FIG. 5A, with the exception that they take place in base station controller BSC/A 3: missing, since there is no old handover leg in this example, as in FIG. 5, 4: side B decides to use an existing local call between BSC/A and BSC/B. Therefore, it sets the value of the HOCT parameter in the HANDOVER_REQUEST message to "existing local call" and includes the directory number DNBnew and the circuit identity code CIC in the message. The message is sent to the BSCF+ of side B.

5: The CIC contained in this HANDOVER_REQUEST message is the identifier of the circuit of A interface, that is, different from the CIC in message 2.

6,7: as in FIG. 5A, but in BSC/B,

8: side A must be informed of which handover type has been decided on. For this reason, the RSCF of side B sets the value of the HOCT parameter of the MAP_PREPARE_HANDOVER_ack message to "existing local call" and includes the directory number DNBnew and the circuit identity code CIC of the reserved circuit (see message 2) in the message.

9: It is assumed herein that the RSCF of side A is able to derive the directory number DNAnew from the directory number DNBnew it has received. DNBnew, DNAnew and CIC are included in the new_leg_command message, which is sent to the BSCF+ of side A for switching the handover leg.

10–17: unnecessary,
18: as in FIG. 5B, but in BSC/A,
19: unnecessary,
20, 21: as in FIG. 5B, but in BSC/A,
22, 23, 24: as in FIG. 5C, but in BSC/B,
25, 26, 27, 28, 29, 30: unnecessary,
31: as in FIG. 5C, but in BSC/B,
32, 33, 34, 35, 36: as shown in FIG. 5C, but in BSC/A.

As appears from the signalling example shown above, using a previously reserved local call as a handover leg results in remarkable reduction in the signalling load especially between the LE and the BSC'S.

It must be noted that a local call-based handover may also be performed in a subsequent handover in accordance with FIGS. 5A–5C between BSC/A and BSC/B'.

Handover based on a permanent connection

Figure 7:
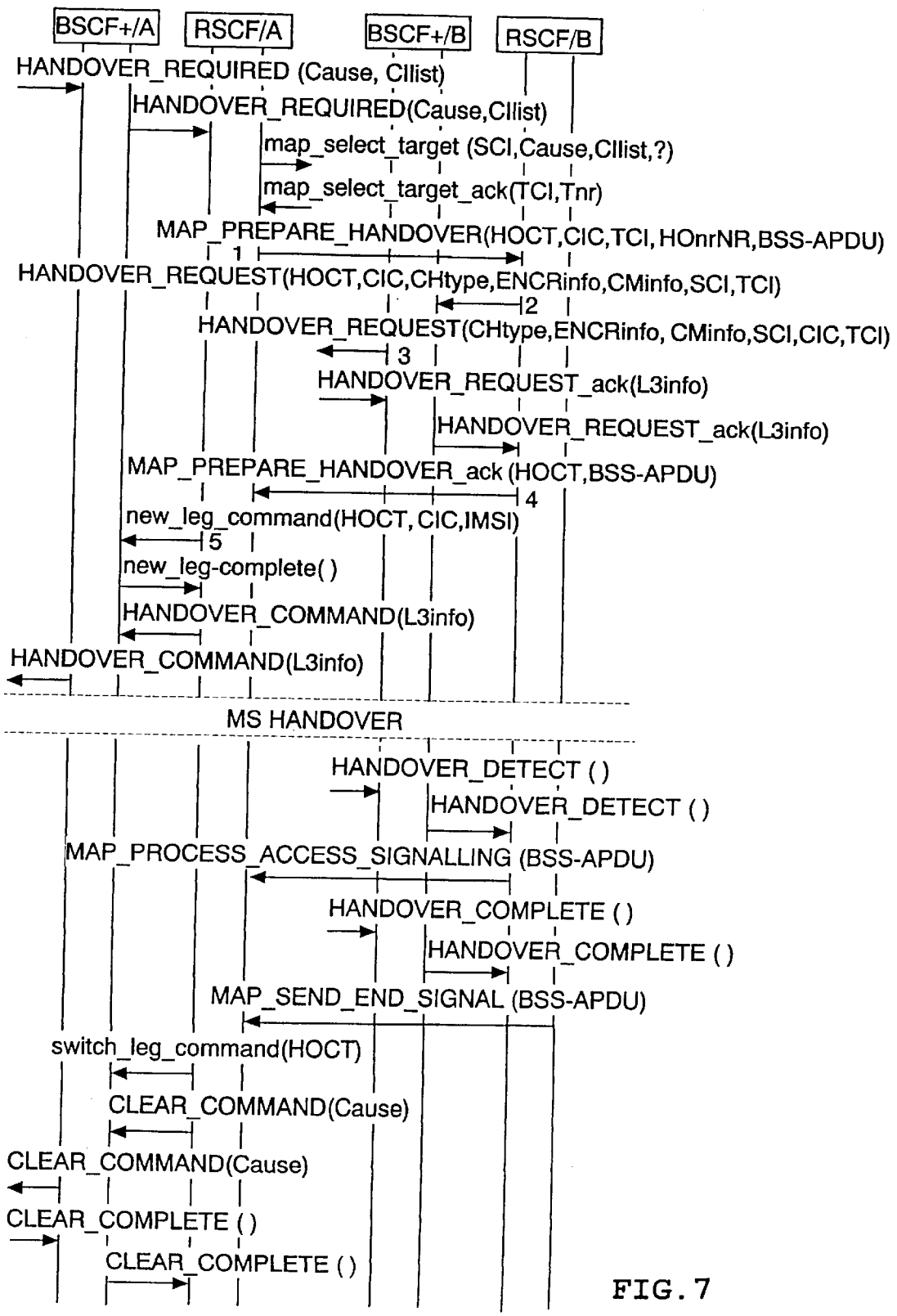
FIG. 7 shows a signalling diagram for a handover based on a permanent connection.

This handover procedure is simpler than the most complicated case of handover. A permanent connection between BSCF/A and BSCF/B is now used. This permanent connection is identified by means of a new CIC parameter. In this example, which is shown in the signalling diagram in FIG. 7, the RSCF on the anchor side A controls allocation of resources, that is, of the CIC. The following explanation only discloses the differences compared with the messages described in the signalling diagram in FIGS. 5A–5C. The value of the HOCT parameter is "permanent connection" in all the messages (cf. Table I).

1: A CIC has been added to the MAP_PREPARE_HANDOVER message. This is due to the fact that the RSCF of side A must communicate to the RSCF of side B which circuit is used on the permanent connection between BSC/A and BSC/B. In the example shown in FIGS. 5A–5C, in which the handover was based on a new local call, both side A and side B were able to choose independently the access circuit used and the directory number DN.

2: The CIC has been added to the HANDOVER_REQUEST message, and DNBnew has been removed as compared with the case shown in FIGS. 5A–5C. The CIC identifies the permanent connection, whereas DNBnew identifies the access circuit, and is thus unnecessary in this example. This CIC may be the same as that in message 1 or derived therefrom.

3: This CIC is different from that in message 2.

4: DNBnew has been removed, side A has decided that a permanent connection is to be used for the handover leg, and has already sent a CIC related to it. Therefore, a new access circuit and a directory number DN corresponding to it are not necessary.

In the new_leg_command message, a CIC is sent instead of directory numbers DNBnew and DNBold. Only the CIC is required for switching the handover leg.

Although the invention has been disclosed with reference to certain embodiments only, it must be understood that the explanation has only been made by way of example, and alterations and modifications may be made to it without deviating from the scope and the spirit of the invention set forth in the attached claims.

TABLE I

| HOCT: | CONNECTION CONTROL AT: | ADDITIONAL PARAMETERS: | COMMENTS: |
|---|---|---|---|
| MAP_PREPARE_HANDOVER (RSCF/A -> RSCF/B) | | | |
| "NEW LOCAL CALL" | A | — | B SIDE DOES NOT NEED TO KNOW THE DN OF THE A SIDE (DNA NEW) BECAUSE THE LOCAL CALL WILL BE ESTABLISHED BY THE A SIDE. |
| "EXISTING LOCAL CALL" | A | DNBnew, CIC | |
| "PERMANENT CONNECTION | A | CIC | |
| "UNDEFINED" | B | | A SIDE JUST EXPECTS B SIDE TO MAKE THE |

TABLE I-continued

| HOCT: | CONNECTION CONTROL AT: | ADDITIONAL PARAMETERS: | COMMENTS: |
|---|---|---|---|
| "NO CONNECTION NEEDED" | NEITHER | | DECISION. |
| | | HANDOVER_REQUEST (RSCF/B -> RSCF+/B) | |
| "NEW LOCAL CALL" | A OR B | DNBnew | |
| "EXISTING LOCAL CALL" | A OR B | DNBnew, CIC | |
| "PERMANENT CONNECTION | A OR B | CIC | |
| "NO CONNECTION NEEDED" | NEITHER | | |
| | | MAP_PREPARE_HANDOVER_ack (RSCF/A -> RSCF/B) | |
| "NEW LOCAL CALL" | A | DNBnew | |
| | B | DNBnew | |
| "EXISTING LOCAL CALL" | A | | DNAnew IS INCLUDED ONLY IF B KNOWS IT. (IN THIS PARAMETER USAGE SCENARIO B KNOWS IF IT HAS SET UP THIS LOCAL CALL. |
| "PERMANENT CONNECTION | A | — | |
| "NO CONNECTION NEEDED" | NEITHER | — | |
| | | new_leg_command (RSCF/A -> RSCF+/A) | |
| "NEW LOCAL CALL" | A OR B | DNAnew,DNBnew | |
| "EXISTING LOCAL CALL" | A OR B | DNAnew,DNBnew,CIC | |
| "PERMANENT CONNECTION | A OR B | CIC | |
| | | switch_leg_command (RSCF/A -> RSCF+/A) | |
| "RELEASE OLD LOCAL CALL" | A OR B | — | IN THIS CASE THE OLD LEG IS BASED ON A LOCAL CALL AND RSCF WANTS THAT LOCAL CALL TO BE RELEASED AFTER SWITCHING THE NEW LEG |
| "NOTHING" | A OR B | — | NO CALL RELEASES NEED TO BE DONE. |

What is claimed is:

1. An arrangement for carrying out a handover between first and second base station controllers in a telecommunications system that comprises a local exchange of a fixed network; mobile stations; base station systems providing the mobile stations with a wireless access network to the local exchange, each base station system comprising a base station controller and a plurality of base stations; transmission circuits for connecting the local exchange to the base station controllers; the control of the handover between the base station controllers being located in the base station controllers so that the first base station controller of the call functions as the anchor point at which the original connection established via the local exchange is maintained, and from which a further connection is established to a second base station controller in a handover, the base station controllers being arranged to maintain the local call connection between base station controllers at the end of the call, and keep it in reserve for the following handover between base station controllers, the first or second base station controller being arranged to make the decision on using said reserved local call connection as a further connection in a new handover between base station controllers and to communicate the decision to the other one of the base station controllers.

2. An arrangement as claimed in claim 1, wherein the base station controllers are arranged to establish a new local call connection between the base station controllers in advance, if necessary, and keep it in reserve for the following handover between the base station controllers.

3. An arrangement as claimed in claim 1, wherein a same local call connection is used for establishing two or more non-simultaneous further handover connections without releasing it between the connections.

4. An arrangement as claimed in claim 1, wherein establishing a further handover connection via said reserved local call connection only involves signalling between the base station controllers.

5. An arrangement as claimed in claim 1, comprising
a permanent transmission connection between at least two base station controllers,
one of the base station controller participating in the handover being arranged to decide whether the further handover connection is a local call switched via an ISDN local exchange, or a connection established via said permanent transmission connection, and to communicate the decision to another base station controller.

6. An arrangement as claimed in claim 5, wherein said local call is a new local call that has been established for a handover.

7. An arrangement as claimed in claim 1, wherein said local call is a local call established previously between the base station controllers and having available transmission capacity.

8. A method for performing a handover between base station controllers in a telecommunications system comprising a local exchange of a fixed network; mobile stations; base station systems providing the mobile stations with a wireless access network to the local exchange, each base station system comprising a base station controller and a plurality of base stations; and transmission circuits for connecting the local exchange to the base station controllers, comprising the steps of:

establishing a connection for a call from the local exchange to a first base station controller serving a mobile station, performing a handover for switching the call and the mobile station from the first base station controller to a second base station controller, controlling the handover by the base station controllers independently of the local exchange, saving the connection from the local exchange to the first base station controller, establishing a further connection from the first base station controller to the second base station controller as a local call switched via the local exchange, switching the call via said further connection to the second base station controller, the method further comprising maintaining the local call connection between the base station controllers at the end of the call, if necessary, and keeping it in reserve for the following handover between base station controllers, making a decision in the first or the second base station controller on using said reserved local call connection as a further connection in a new handover between base station controllers, communicating the decision from the base station controller that has made the decision to the other one of the base station controllers, establishing a further handover connection via said reserved local call connection from the first base station controller to the second base station controller.

9. A method as claimed in claim 8, comprising a step of using the same local call connection for establishing two or more non-simultaneous further handover connections without releasing it between the connections.

10. A method as claimed in claim 8, comprising a step of establishing a further handover connection via said reserved local call connection by means of signalling between the base station controllers only.

11. A method as claimed in claim 8, comprising the steps of deciding in the first or the second base station controller whether a further handover connection is established from the first base station controller to the second base station controller as a local call switched via the local exchange or via a permanent transmission connection between the base station controllers, communicating from the base station controller that has made the decision, the selected handover connection type to the second base station controller, establishing a further connection in accordance with the selected connection type from the first base station controller to the second base station controller.

12. A method for performing a handover between base station controllers in a communications system comprising a local exchange of a fixed network; mobile stations; base station systems providing the mobile stations with a wireless access network to the local exchange, each base station system comprising a base station controller and a plurality of base stations; and transmission circuits for connecting the local exchange to a base station controllers, comprising the steps of:

establishing a call connection from the local exchange to the first base station controller serving a mobile station, performing a handover for switching the call and the mobile station from the first base station controller to a second base station controller, establishing a new local call connection in advance and keeping it in reserve for a handover between base station controllers, controlling the handover by the base station controllers independently of the local exchange, saving the call connection from the local exchange to the first base station controller, making a decision in the first or the second base station controller on using said reserved local call connection as a further connection in a new handover between base station controllers, communicating the decision by the base station controller that has made the decision, to the other base station controller, establishing a further handover connection via said reserved local call connection from the first base station controller to the second base station controller.

13. A method as claimed in claim 12, comprising a step of using a same local call connection for establishing two or more non-simultaneous simultaneous further handover connections without releasing the call between the connections.

14. A method as claimed in claim 12, comprising a step of establishing a further handover connection via said reserved local call connection by means of signalling between the base station controllers only.

\* \* \* \* \*